United States Patent
Dziak et al.

(10) Patent No.: US 9,129,616 B1
(45) Date of Patent: Sep. 8, 2015

(54) AUTOMATIC GAIN CONTROL WITH EARLY ACQUISITION

(71) Applicant: Avago Technologies General IP (Singapore) Pte. Ltd., Singapore (SG)

(72) Inventors: Scott Dziak, Ft. Collins, CO (US); Haotian Zhang, Longmont, CO (US); Haitao Xia, San Jose, CA (US)

(73) Assignee: AVAGO TECHNOLOGIES GENERAL IP (SINGAPORE) PTE. LTD., Singapore (SG)

( * ) Notice: Subject to any disclaimer, the term of this patent is extended or adjusted under 35 U.S.C. 154(b) by 0 days.

(21) Appl. No.: 14/515,510

(22) Filed: Oct. 15, 2014

(51) Int. Cl.
*G11B 5/09* (2006.01)

(52) U.S. Cl.
CPC .................................... *G11B 5/09* (2013.01)

(58) Field of Classification Search
CPC .... G11B 20/10009; G11B 5/09; G11B 5/012; G11B 5/02

USPC ........... 360/46, 67, 68, 124.11; 330/124, 133, 330/134

See application file for complete search history.

(56) References Cited

U.S. PATENT DOCUMENTS

| | | | |
|---|---|---|---|
| 7,072,130 B2 * | 7/2006 | Annampedu | 360/46 |
| 8,077,419 B1 | 12/2011 | Pai et al. | |
| 2011/0188147 A1 | 8/2011 | Cho et al. | |

\* cited by examiner

*Primary Examiner* — Nabil Hindi
(74) *Attorney, Agent, or Firm* — Hamilton DeSanctis & Cha

(57) ABSTRACT

A system for accessing a data from a storage device includes a gain value calculation circuit operable to calculate a first gain value based upon a data set, an early gain acquisition circuit operable to generate a second gain value in parallel to calculation of the first gain value by the gain value calculation circuit, and a gain combination circuit operable to combine the first gain value and the second gain value to yield a third gain value.

20 Claims, 3 Drawing Sheets

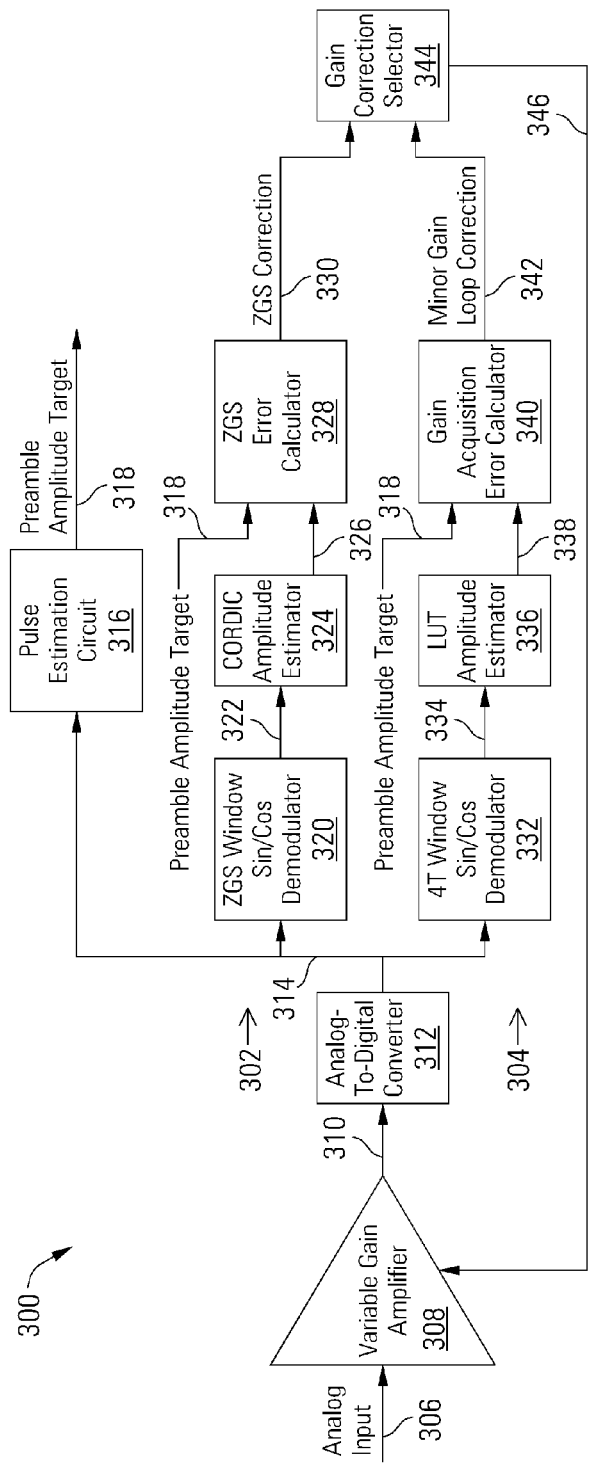
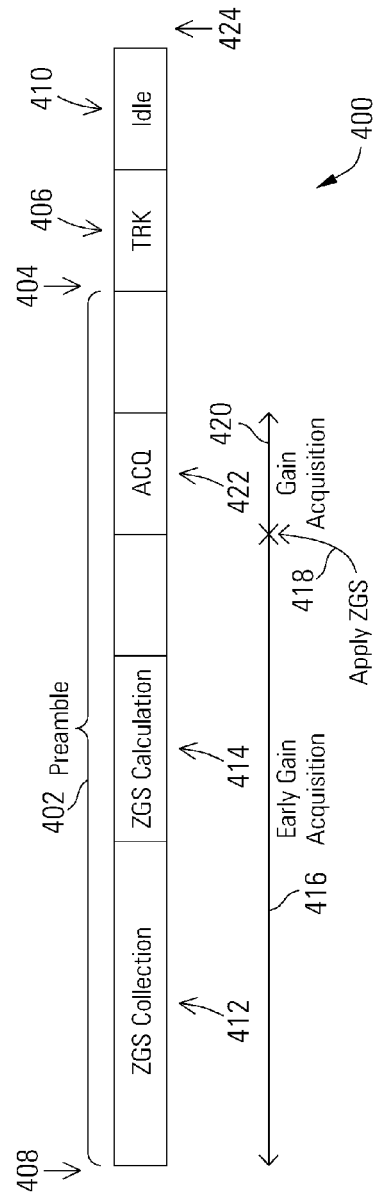
FIG. 3
FIG. 4

AUTOMATIC GAIN CONTROL WITH EARLY ACQUISITION

FIELD OF THE INVENTION

Various embodiments of the present invention provide systems and methods for performing gain control, and more particularly to systems and methods for performing automatic gain control using multiple techniques simultaneously.

BACKGROUND

A typical storage device includes a magnetic storage medium that includes magnetically represented information stored thereon. A head is disposed in relation to the storage medium that senses the magnetically represented information and provides an electrical signal representing the information. This electrical signal is ultimately passed to a read channel circuit that performs one or more data detection processes in order to recover the information originally written to the storage medium. The signal derived from the magnetic storage medium is provided to a gain control loop to correct gain errors during a gain acquisition stage based on a preamble pattern on the storage medium. However, the acquisition length of the gain loop is relatively short and this can degrade performance of the read channel due to residual gain errors at the end of the gain acquisition stage.

SUMMARY

Various embodiments of the present invention provide systems and methods for performing gain control, and more particularly to systems and methods for performing automatic gain control using multiple techniques simultaneously.

Some embodiments of the present invention provide a system for accessing a data from a storage device including a gain value calculation circuit operable to calculate a first gain value based upon a data set, an early gain acquisition circuit operable to generate a second gain value in parallel to calculation of the first gain value by the gain value calculation circuit, and a gain combination circuit operable to combine the first gain value and the second gain value to yield a third gain value.

This summary provides only a general outline of some embodiments of the invention. The phrases "in one embodiment," "according to one embodiment," "in various embodiments", "in one or more embodiments", "in particular embodiments" and the like generally mean the particular feature, structure, or characteristic following the phrase is included in at least one embodiment of the present invention, and may be included in more than one embodiment of the present invention. Importantly, such phrases do not necessarily refer to the same embodiment. This summary provides only a general outline of some embodiments of the invention. Additional embodiments are disclosed in the following detailed description, the appended claims and the accompanying drawings.

BRIEF DESCRIPTION OF THE FIGURES

A further understanding of the various embodiments of the present invention may be realized by reference to the figures which are described in remaining portions of the specification. In the figures, like reference numerals may be used throughout several drawings to refer to similar components. In the figures, like reference numerals are used throughout several figures to refer to similar components.

FIG. 3 depicts a gain control circuit with early acquisition in accordance with some embodiments of the present invention;

FIG. 4 depicts a state timeline showing simultaneous Zero Gain Start calculation and early gain acquisition in accordance with some embodiments of the present invention.

DETAILED DESCRIPTION OF THE INVENTION

An automatic gain control circuit with early acquisition is disclosed herein which performs gain corrections in a variable gain amplifier using multiple techniques in parallel. A Zero Gain Start (ZGS) calculation is performed to identify relatively large gain distortions. In parallel, a gain loop performs early gain acquisition to adapt the variable gain amplifier to correct smaller gain distortions. In some embodiments, the ZGS calculation and the early gain acquisition are performed at least partly in parallel using samples representing a preamble pattern. At the end of an early gain acquisition period, the gain corrections obtained by the ZGS calculation and the early gain acquisition are considered to determine the gain correction value to use as the initial variable gain amplifier configuration for a subsequent gain acquisition stage.

Figure 1:
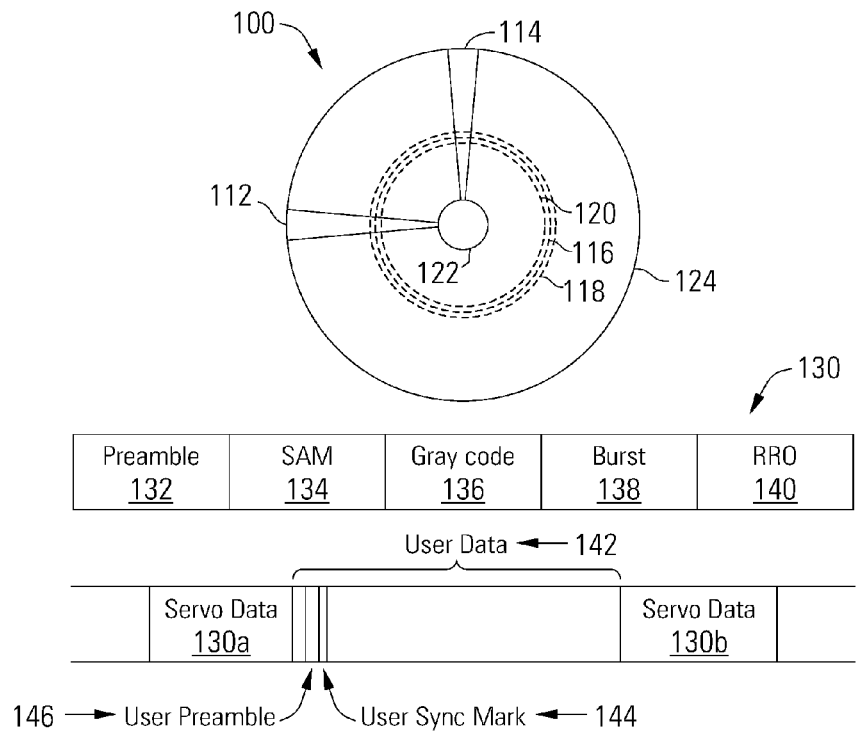
FIG. 1 is a diagram of a magnetic storage medium and sector data scheme that may be used with a gain control circuit with early acquisition in accordance with some embodiments of the present invention.

The automatic gain control circuit is not limited to use with any particular data source. In some embodiments, the automatic gain control circuit is included in a read channel circuit in a magnetic storage system or hard drive, adjusting the gain in a variable gain amplifier based on a preamble pattern. Turning to FIG. 1, a magnetic storage medium 100 is shown with an example data track 116 and its two adjacent neighboring data tracks 118, 120, indicated as dashed lines. The tracks 116, 118, 120 are segregated by servo data written within servo wedges 112, 114. It should be noted that while three tracks 116, 118, 120 and two servo wedges 112, 114 are shown, hundreds of wedges and tens of thousands of tracks may be included on a given storage medium.

The servo wedges 112, 114 include servo data 130 that is used for control and synchronization of a read/write head assembly over a desired location on storage medium 100. In particular, the servo data 130 generally includes a preamble pattern 132 followed by a servo address mark 134, a Gray code 136, a burst field 138, and a repeatable run-out (RRO) field 140. In some embodiments, a servo data set has two or more fields of burst information. It should be noted that different information can be included in the servo fields. Between the servo data bit patterns 130a and 130b, a user data region 142 is provided. User data region 142 can include one or more user data fragments that are stored on storage medium 100. The start of each user data fragment is identified by a preamble 146 and user synchronization information or syncmark 144, identifying the location of user data fragments within the user data region 142. A number of user data fragments combine to form a data sector. The preamble pattern is not limited to any particular pattern, but in some cases, is a 2T repeating pattern such as "1100" which has a transition from 0 to 1 or 1 to 0 every 2T, where T is a bit period or time period allocated for every bit. Such a 2T repeating pattern ensures that the corresponding analog readback waveform is a sinusoid having an associated 2T frequency.

In operation, storage medium 100 is rotated in relation to a sensor that senses information from the storage medium. In a read operation, the sensor would sense servo data from wedge 112 (i.e., during a servo data period) followed by user data from a user data region between wedge 112 and wedge 114 (i.e., during a user data period) and then servo data from wedge 114. At the beginning of each read operation, the gain in a variable gain amplifier used to amplify the signal from the sensor is automatically adjusted in the gain control circuit with early acquisition. In a write operation, the sensor would sense servo data from wedge 112 then write data to the user data region between wedge 112 and wedge 114, with location information in the user data region provided by a user syncmark 144 and a user preamble 146.

Figure 2:
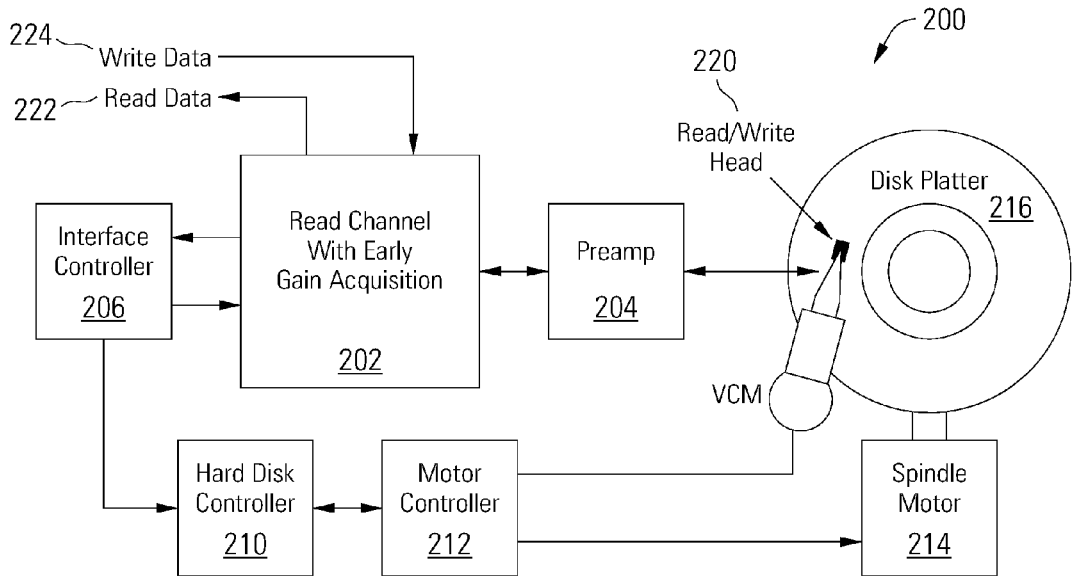
FIG. 2 depicts a storage system including a read channel with a gain control circuit with early acquisition in accordance with some embodiments of the present invention.

Turning to FIG. 2, a storage system 200 is disclosed which includes a read channel circuit 202 with a gain control circuit with early gain acquisition in accordance with some embodiments of the present invention. Storage system 200 may be, for example, a hard disk drive. Storage system 200 also includes a preamplifier 204, an interface controller 206, a hard disk controller 210, a motor controller 212, a spindle motor 214, a disk platter 216, and a read/write head assembly 220. Interface controller 206 controls addressing and timing of data to/from disk platter 216. The data on disk platter 216 consists of groups of magnetic signals that may be detected by read/write head assembly 220 when the assembly is properly positioned over disk platter 216. In one embodiment, disk platter 216 includes magnetic signals recorded in accordance with either a longitudinal or a perpendicular recording scheme.

In a typical read operation, read/write head assembly 220 is accurately positioned by motor controller 212 over a desired data track on disk platter 216. Motor controller 212 both positions read/write head assembly 220 in relation to disk platter 216 and drives spindle motor 214 by moving read/write head assembly 220 to the proper data track on disk platter 216 under the direction of hard disk controller 210. Spindle motor 214 spins disk platter 216 at a determined spin rate (RPMs). Once read/write head assembly 220 is positioned adjacent the proper data track, magnetic signals representing data on disk platter 216 are sensed by read/write head assembly 220 as disk platter 216 is rotated by spindle motor 214. The sensed magnetic signals are provided as a continuous, minute analog signal representative of the magnetic data on disk platter 216. This minute analog signal is transferred from read/write head assembly 220 to read channel circuit 202 via preamplifier 204. Preamplifier 204 is operable to amplify the minute analog signals accessed from disk platter 216. In turn, read channel circuit 202 amplifies the received analog signal in a variable gain amplifier, adjusting the gain in the variable gain amplifier as the preamble pattern is read in an early acquisition operation using both a ZGS calculation and a gain loop. At the end of the early acquisition stage, a determination is made about whether to apply the results of the ZGS calculation or to use the gain value reached by the gain loop. In some embodiments, gain adaptation continues from this point until at least the end of the preamble. The read channel circuit 202 then digitizes and decodes user data represented by the received analog signal to recreate the information originally written to disk platter 216. This data is provided as read data 222 to a receiving circuit. A write operation is substantially the opposite of the preceding read operation with write data 224 being provided to read channel circuit 202. This data is then encoded and written to disk platter 216.

It should be noted that in some embodiments storage system 200 is integrated into a larger storage system such as, for example, a RAID (redundant array of inexpensive disks or redundant array of independent disks) based storage system. Such a RAID storage system increases stability and reliability through redundancy, combining multiple disks as a logical unit. Data can be spread across a number of disks included in the RAID storage system according to a variety of algorithms and accessed by an operating system as if it were a single disk. For example, data can be mirrored to multiple disks in the RAID storage system, or can be sliced and distributed across multiple disks in a number of techniques. If a small number of disks in the RAID storage system fail or become unavailable, error correction techniques can be used to recreate the missing data based on the remaining portions of the data from the other disks in the RAID storage system. The disks in the RAID storage system can be, but are not limited to, individual storage systems such storage system 200, and can be located in close proximity to each other or distributed more widely for increased security. In a write operation, write data is provided to a controller, which stores the write data across the disks, for example by mirroring or by striping the write data. In a read operation, the controller retrieves the data from the disks. The controller then yields the resulting read data as if the RAID storage system were a single disk.

In addition, it should be noted that in some embodiments storage system 200 is modified to include solid state memory that is used to store data in addition to the storage offered by disk platter 216. This solid state memory may be used in parallel to disk platter 216 to provide additional storage. In such a case, the solid state memory receives and provides information directly to read channel circuit 202. Alternatively, the solid state memory may be used as a cache where it offers faster access time than that offered by disk platter 216. In such a case, the solid state memory may be disposed between interface controller 206 and read channel circuit 202 where it operates as a pass through to disk platter 216 when requested data is not available in the solid state memory or when the solid state memory does not have sufficient storage to hold a newly written data set. Based upon the disclosure provided herein, one of ordinary skill in the art will recognize a variety of storage systems including both disk platter 216 and a solid state memory.

Turning to FIG. 3, an automatic gain control circuit 300 includes a gain value calculation circuit and an early gain acquisition circuit which operate at least partially in parallel. In the embodiment of FIG. 3, the gain value calculation circuit comprises a ZGS calculation circuit 302 and the early gain acquisition circuit comprises a gain loop 304. In some embodiments, both the ZGS calculation circuit 302 and the gain loop 304 operate on digital data samples representing a preamble field preceding user data on a storage device. Both the ZGS calculation circuit 302 and the gain loop 304 correct gain errors in a variable gain amplifier 308.

The ZGS calculation circuit 302 calculates a gain error which can be used to configure the variable gain amplifier 308 in a discrete adjustment. The ZGS calculation circuit 302 is generally useful for calculating large gain corrections, but has a relatively long latency and can be particularly susceptible to noise.

The gain loop 304 calculates and applies gain corrections more gradually and with lower latency. The gain loop 304 is generally useful for applying smaller gain corrections, adapting the configuration of the variable gain amplifier 308 over time. The gain loop 304 operates in parallel with the ZGS calculation circuit 302, applying gain corrections to the variable gain amplifier 308 during an early gain acquisition period while the ZGS calculation circuit 302 is still collecting samples and calculating the gain correction.

At the end of the early gain acquisition period, the gain correction calculated by the ZGS calculation circuit 302 is compared with the overall gain adjustments applied by the gain loop 304, and if the gain value in the variable gain amplifier 308 needs adjustment beyond that applied by the gain loop 304 during the early gain acquisition period, it is adjusted based on the gain correction calculated by the ZGS calculation circuit 302 and the adjustment previously applied by the gain loop 304 during the early gain acquisition period.

In some embodiments, the gain loop 304 continues to adapt the gain of the variable gain amplifier 308 in a gain acquisition period, starting from the gain value applied at the end of the early gain acquisition period.

An analog signal 306 is received by the 300 gain control circuit and amplified in a variable gain amplifier 308, with the magnitude of the gain controlled by a gain control signal 346. In some cases, analog signal 306 is derived from a read/write head assembly in a magnetic storage medium. In other cases, analog signal 302 is derived from a receiver circuit that is operable to receive a signal from a transmission medium. The transmission medium may be wireless or wired such as, but not limited to, cable or optical connectivity. Based upon the disclosure provided herein, one of ordinary skill in the art will recognize a variety of sources from which analog signal 306 may be derived.

The variable gain amplifier 308 amplifies the analog signal 306 and provides amplified analog signal 310 to an analog to digital converter 312. Analog to digital converter 312 converts processed analog signal 310 into a corresponding series of digital samples 314. Analog to digital converter 312 may be any circuit known in the art that is capable of producing digital samples corresponding to an analog input signal. Based upon the disclosure provided herein, one of ordinary skill in the art will recognize a variety of analog to digital converter circuits that may be used in relation to different embodiments of the present invention. Digital samples 314 corresponding to user data can be further processed to recover stored or transmitted data, for example through equalization, application of data detection algorithms such as soft output Viterbi algorithms or maximum a posteriori algorithms, data decoding algorithms such as low density parity check decoding, Reed Solomon decoding, etc. By correcting gain errors in the variable gain amplifier 308, such subsequent processing of the digital samples 314 becomes more reliable.

The digital samples 314 can also be processed by a pulse estimation circuit 316 to calculate a preamble amplitude target 318, which represents an ideal amplitude of digital samples corresponding to a preamble pattern. The preamble amplitude target 318 can be calculated in any suitable manner. In some embodiments, the pulse estimation circuit 316 comprises a digital finite impulse response filter that equalizes the digital samples 314 and a data detector that detects the values of data bits in the equalized digital samples to yield detected data. A loop pulse estimation circuit estimates the input pulse shape, convolves the loop pulse estimation with the 2T preamble pattern to yield the ideal preamble waveform, and then calculates the preamble amplitude target 318 from the ideal preamble waveform. Again, the pulse estimation circuit 316 is not limited to any particular technique or circuit for calculating the preamble amplitude target 318 based on the digital samples 314. Based upon the disclosure provided herein, one of ordinary skill in the art will recognize a variety of techniques for obtaining the preamble amplitude target 318 that may be used in relation to different embodiments of the present invention.

The digital samples 314 are also provided to the ZGS calculation circuit 302 and gain loop 304 during an early gain acquisition period when the digital samples 314 are derived from a preamble pattern. The ZGS calculation circuit 302 includes a ZGS window sin/cos demodulator 320, which extracts sine and cosine components 322 from preamble samples received within a fixed length window selected for ZGS calculation. The ZGS window can have any suitable length, such as, but not limited, 32 bits. In some embodiments, the ZGS window sin/cos demodulator 320 computes the Discrete Fourier Transform (DFT) of the preamble at the fundamental frequency to obtain the sine and cosine DFT coefficients according to the following equations:

$$\text{Fund\_sin} = \sum_{k=0}^{Length-1} x(k) * \sin\left(\frac{2\pi k}{N}\right) \quad \text{(Eq 1)}$$

$$\text{Fund\_cos} = \sum_{k=0}^{Length-1} x(k) * \cos\left(\frac{2\pi k}{N}\right) \quad \text{(Eq 2)}$$

where N is the fundamental frequency of the preamble pattern, or N=4 for a 2T preamble pattern. The sum over k is an integral multiple of periods of the preamble defining the ZGS window, such as, but not limited to, 16 or 32. x(n) are the digital samples 314. Based upon the disclosure provided herein, one of ordinary skill in the art will recognize a variety of circuits for calculating the sine and cosine components 322 that may be used in relation to different embodiments of the present invention.

The sine and cosine components 322 are provided to an amplitude estimator circuit 324, which in some cases uses a CORDIC or COordinate Rotation DIgital Computer convert the DFT coefficients represented by the sine and cosine components 322 to a fundamental magnitude 326 of the preamble according to the following equation:

$$\text{Fund\_mag} = \frac{\sqrt{\text{Fund\_sin}^2 + \text{Fund\_cos}^2}}{Length/2} \quad \text{(Eq 3)}$$

where Length is the ZGS window length. Based upon the disclosure provided herein, one of ordinary skill in the art will recognize a variety of circuits for calculating the fundamental magnitude from the sine and cosine components that may be used in relation to different embodiments of the present invention.

The preamble amplitude 326 is provided to a ZGS error calculator 328 which calculates an open loop ZGS gain correction 330 based on the preamble amplitude target 318 and the preamble amplitude 326. In some cases, the ZGS error calculator 328 calculates the ZGS gain correction 330 according to the following equation:

$$\text{ZGS\_corr} = \frac{\text{preamble amplitude target}}{\text{Fund\_mag}} \quad \text{(Eq 4)}$$

Based upon the disclosure provided herein, one of ordinary skill in the art will recognize a variety of circuits for calculating the ZGS gain correction 330 that may be used in relation to different embodiments of the present invention.

In parallel with the ZGS calculation circuit 302, the digital samples 314 are also processed during the early gain acquisition period by the gain loop 304 to gradually correct gain errors in the variable gain amplifier 308. A 4T window sin/cos demodulator 332 which extracts sine and cosine components 334 from preamble samples received within a shorter gain loop window, which in some cases is a 4T window. In some embodiments, the 4T window sin/cos demodulator 332 computes the Discrete Fourier Transform (DFT) of the preamble at the fundamental frequency to obtain the sine and cosine DFT coefficients according to Equations 1 and 2, although over a much shorter window, such as a 4T window. Based upon the disclosure provided herein, one of ordinary skill in the art will recognize a variety of circuits for calculating the sine and cosine components 334 that may be used in relation to different embodiments of the present invention.

A lookup table-based amplitude estimator 336 yields the preamble amplitude 338 by retrieving predetermined amplitude values for the various sine and cosine components 334. Based upon the disclosure provided herein, one of ordinary skill in the art will recognize a variety of lookup table circuits that may be used in relation to different embodiments of the present invention.

A gain acquisition error calculator 340 computes a minor gain loop correction 342 by dividing the preamble amplitude target 318 by the preamble amplitude 338 according to Equation 3. Based upon the disclosure provided herein, one of ordinary skill in the art will recognize a variety of circuits for calculating the minor gain loop correction 342 that may be used in relation to different embodiments of the present invention. In some embodiments, the gain acquisition error calculator 340 calculates an amplitude error as:

$$\text{amplitude\_error} = (\text{preamble\_amplitude\_target}) - (\text{fast\_error\_estimate}) \quad (\text{Eq 5})$$

where preamble_amplitude_target is the preamble amplitude target 318 and where fast_error_estimate is the preamble amplitude 338 calculated by the lookup table-based amplitude estimator 336. The gain driving the variable gain amplifier 308 is accumulated as follows:

$$\text{VGAR}[n] = \text{VGAR}[n-1] + u * \text{amplitude\_error} \quad (\text{Eq 6})$$

where u is the loop update rate constant. This calculation is performed continually in some embodiments from the start of the read event until the ZGS is computed.

The calculation of the ZGS gain correction 330 thus has a longer latency than the minor gain loop correction 342, although it can generally identify larger gain corrections than can be gradually applied by the minor gain loop correction 342 during the early gain acquisition period. During the early gain acquisition period, a gain correction selector 344 or gain combination circuit selects the minor gain loop correction 342 as the gain control signal 346 to be applied to the variable gain amplifier 308. At the end of the early gain acquisition period, when the ZGS gain correction 330 has been calculated by the ZGS calculation circuit 302, the gain correction selector 344 determines whether the ZGS gain correction 330 should be applied to the variable gain amplifier 308 or whether the gradual adaptations or corrections previously applied by the ZGS calculation circuit 302 during the early gain acquisition period are sufficient.

Turning to FIG. 4, a state timeline 400 illustrates the simultaneous computation of ZGS gain correction 330 and the minor gain loop corrections during the early gain acquisition period 416 in accordance with some embodiments of the present invention. At the start of a read event, as the preamble pattern 402 is received, a ZGS collection operation 412 collects samples within a ZGS window. When the ZGS collection 412 is complete, the ZGS calculation 414 is performed according to Equations 1-4. In parallel with the ZGS collection 412 and ZGS calculation 414 performed by the ZGS calculation circuit (e.g., 302), the gain loop (e.g., 304) performs a lower latency gain correction in an early gain acquisition 416. At the end 418 of the early gain acquisition 416, a gain correction selector (e.g., 344) determines whether to apply the ZGS gain correction or whether the gain corrections applied by the gain loop (e.g., 304) during the early gain acquisition 416 were sufficient. In some embodiments, a gain acquisition 420 continues during an ACQ period 422, in which the gain loop (e.g., 304) continues to adapt the gain of the variable gain amplifier (e.g., 308) from the gain value resulting at the end of the early gain acquisition 416. The early gain acquisition 416 and gain acquisition 420 periods generally take place as the preamble pattern 402 is received. A user data period 406 follows, with a user syncmark indicating the start 404 of user data in some cases. An idle period 410 can follow the user data period 406. Servo data fields can be processed before 408 and, at times, following 424 the preamble pattern 402 and user data 406.

Again, the ZGS gain correction 330 calculated by the ZGS calculation circuit 302 can apply larger gain corrections to the variable gain amplifier 308 than the minor gain loop correction 342 calculated by the gain loop 304, but has a higher latency and can be more susceptible to noise.

In some embodiments, the gain correction selector 344 determines whether to apply the ZGS gain correction 330 at the end (e.g., 418) of the early gain acquisition using a circuit implementing the following algorithm:

1) At the beginning of each read event (e.g., point 408), save the initial gain value of the variable gain amplifier as VGAR_start.

2) At the end of early gain acquisition (e.g., point 418), save the gain value of the variable gain amplifier as adapted by the gain loop (e.g., 304) as VGAR_eacq.

3) If ZGS-based gain correction is enabled with a threshold ZGS_TH:
    If the ZGS gain correction 330 ZGSR<=ZGS_TH, VGAR_new=VGAR_eacq.
    If ZGSR>ZGS_TH, VGAR_temp=VGAR_start+ZGSR.
        If ((ZGSR>=0 && VGAR_temp>VGAR_eacq)||
        (mZGSR<0 &&VGAR_temp<VGAR_eacq))
        VGAR_new=VGAR_temp
        Else: VGAR_new=VGAR_eacq.

4) Begin the gain acquisition stage 420 from VGAR_new.

In some embodiments, the variable gain amplifier 308 is logarithmic, thus the VGAR_start value is updated by adding ZGSR, which is defined as ZGSR==Log (ZGS_Corr) with ZGS_Corr calculated according to Equation 4. In some other embodiments, in which the variable gain amplifier 308 is not logarithmic, the VGAR_start value is updated using a multiplication operation.

Thus, the ZGS gain correction 330 is applied to the variable gain amplifier 308 by the gain correction selector 344 only if the ZGS gain correction 330 is greater than a threshold value. Further, if the gain loop 304 has already applied a larger gain correction during early gain acquisition than would be applied by the ZGS gain correction 330, the ZGS gain correction 330 is not applied and the variable gain amplifier 308 is left configured as adapted by the ZGS calculation circuit 302 during early gain acquisition. Finally, if the ZGS gain correction 330 and the minor gain loop correction 342 would adapt the gain in different directions, for example if one would increase the gain and the other would decrease the gain, in some embodiments the results of the gain loop 304 are given priority and the ZGS gain correction 330 is discarded due to the greater susceptibility of the ZGS gain computation to noise.

Figure 5:
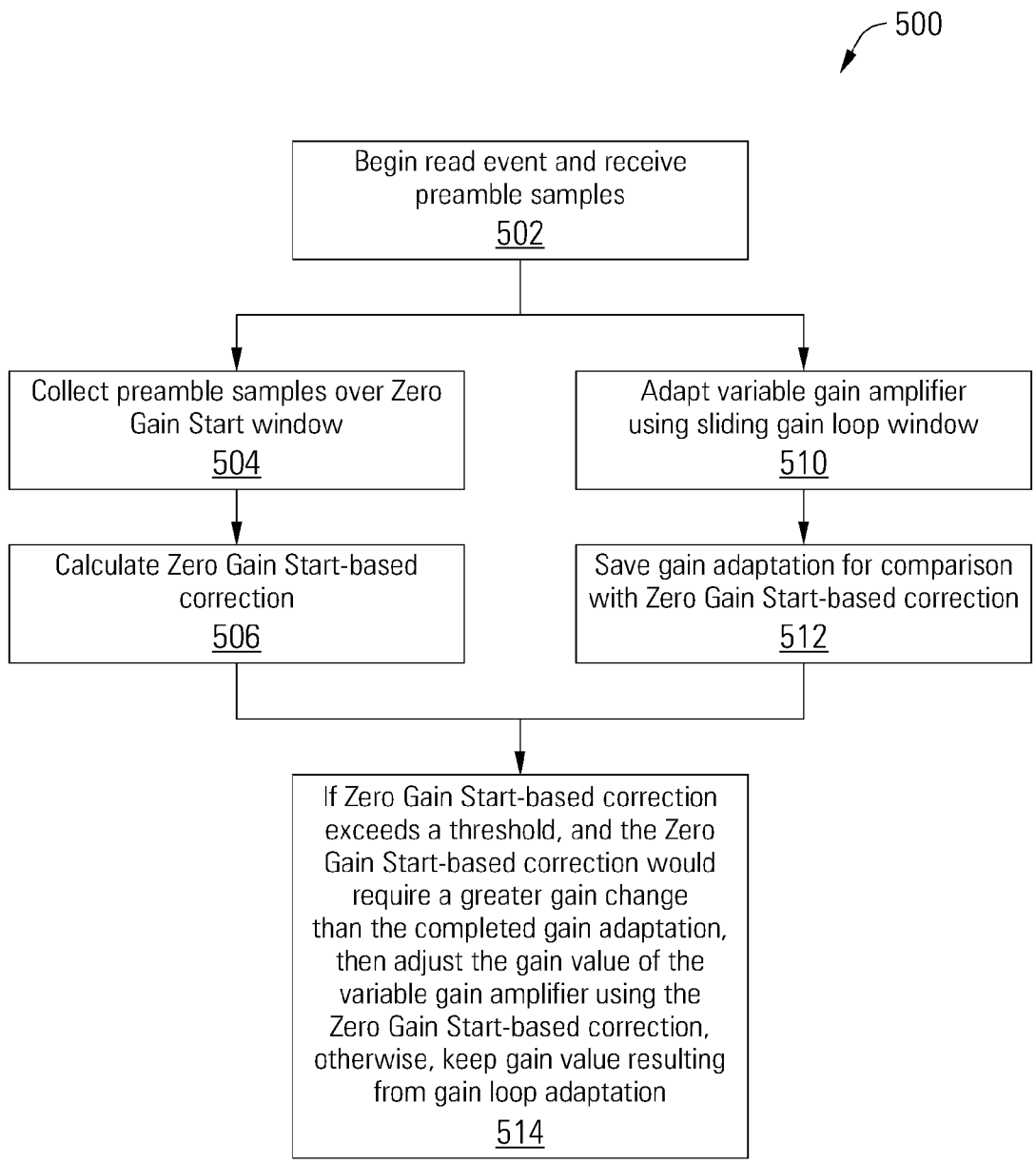
FIG. 5 is a flow diagram showing a method for automatic gain control with early acquisition in accordance with some embodiments of the present invention.

Turning to FIG. 5, a flow diagram 500 depicts a method for automatic gain control with early acquisition in accordance with some embodiments of the present invention. Following flow diagram 500, preamble samples are received from the beginning of a read event. (Block 502) The ZGS gain calculation is performed by collecting preamble samples over the ZGS window (Block 504) and calculating the ZGS-based gain correction. (Block 506) The collection and calculation for ZGS-based gain correction is performed in some embodiments according to Equations 1-4 and the timeline of FIG. 4. In parallel with the collection and calculation for ZGS-based gain correction, a gain loop adapts the gain during early gain acquisition, adapting the variable gain amplifier using a sliding gain loop window over the preamble samples (Block 510), and saving the gain adaptation for comparison with the ZGS-based gain correction. (Block 512)

At the end of the early gain acquisition period, if the ZGS-based correction exceeds a threshold, and the Zero Gain Start-based correction would require a greater gain change than the completed gain adaptation, then the gain value of the variable gain amplifier is adjusted using the ZGS-based correction, otherwise, the gain value resulting from gain loop adaptation is used. (Block 514) The early gain acquisition performed by the gain control circuit in parallel with the ZGS-based gain correction as disclosed herein improves channel gain acquisition performance.

It should be noted that the various blocks shown in the drawings and discussed herein may be implemented in integrated circuits along with other functionality. Such integrated circuits may include all of the functions of a given block, system or circuit, or a subset of the block, system or circuit. Further, elements of the blocks, systems or circuits may be implemented across multiple integrated circuits. Such integrated circuits may be any type of integrated circuit known in the art including, but are not limited to, a monolithic integrated circuit, a flip chip integrated circuit, a multichip module integrated circuit, and/or a mixed signal integrated circuit. It should also be noted that various functions of the blocks, systems or circuits discussed herein may be implemented in either software or firmware. In some such cases, the entire system, block or circuit may be implemented using its software or firmware equivalent. In other cases, the one part of a given system, block or circuit may be implemented in software or firmware, while other parts are implemented in hardware.

In conclusion, the present invention provides novel automatic gain control with early acquisition. While detailed descriptions of one or more embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. A system for accessing a data from a storage device, comprising:
    a gain value calculation circuit operable to calculate a first gain value based upon a data set;
    an early gain acquisition circuit operable to generate a second gain value in parallel to calculation of the first gain value by the gain value calculation circuit; and
    a gain combination circuit operable to combine the first gain value and the second gain value to yield a third gain value.

2. The system of claim 1, wherein the data set is derived from a magnetic storage medium.

3. The system of claim 1, wherein the data set represents a preamble pattern.

4. The system of claim 1, wherein the early gain acquisition circuit comprises a shorter latency than the gain value calculation circuit.

5. The system of claim 1, wherein the early gain acquisition circuit calculates a plurality of second gain values while the gain value calculation circuit calculates the first gain value.

6. The system of claim 1, further comprising a variable gain amplifier operable to amplify a signal from which the data set is derived to yield an amplified signal, based upon the third gain value.

7. The system of claim 6, further comprising an analog to digital converter operable to sample the amplified signal to yield the data set.

8. The system of claim 1, wherein the early gain acquisition circuit is operable to continue to update the second gain value during a gain acquisition period using the third gain value as a starting point.

9. The system of claim 1, wherein the gain value calculation circuit comprises a Zero Gain Start calculation circuit.

10. The system of claim 9, wherein the Zero Gain Start calculation circuit comprises a sin/cos demodulator.

11. The system of claim 10, wherein the Zero Gain Start calculation circuit further comprises a CORDIC amplitude estimation circuit.

12. The system of claim 11, wherein the Zero Gain Start calculation circuit further comprises a division circuit operable to divide an output of the CORDIC amplitude estimation circuit by a preamble amplitude target.

13. The system of claim 11, further comprising a pulse estimation circuit operable to calculate the preamble amplitude target based at least in part on the data set.

14. A method for controlling gain, comprising:
    receiving a data set derived from a storage medium;
    calculating a gain correction based upon a first portion of the data set;
    performing a plurality of adaptations to a gain value in a variable gain amplifier in parallel to calculation of the gain correction; and
    applying a difference between the gain correction and the plurality of adaptations to the variable gain amplifier when the gain correction is greater than the plurality of adaptations.

15. The method of claim 14, further comprising continuing to adapt the gain value in the variable gain amplifier starting from the gain value resulting from said applying the difference between the gain correction and the plurality of adaptations.

16. The method of claim 14, wherein the data set represents a preamble pattern.

17. The method of claim 14, further comprising comparing the gain correction with a threshold and performing said applying the difference between the gain correction and the plurality of adaptations only when the gain correction exceeds the threshold.

18. The method of claim 14, wherein calculating the gain correction comprises calculating a Zero Gain Start based at least in part on the data set.

19. The method of claim 18, further comprising calculating a preamble amplitude target, wherein calculating the gain correction comprises calculating the Zero Gain Start based at least in part on the preamble amplitude target.

20. An apparatus for controlling gain, comprising:
- a variable gain amplifier;
- an analog to digital converter connected to the variable gain amplifier;
- a Zero Gain Start calculation circuit connected to an output of the analog to digital converter;
- an early gain acquisition circuit connected to an output of the analog to digital converter; and
- a gain combination circuit comprising inputs connected to outputs of the Zero Gain Start calculation circuit and early gain acquisition circuit and comprising an output connected to the variable gain amplifier.

* * * * *